United States Patent
Tochigi et al.

(10) Patent No.: US 12,447,960 B2
(45) Date of Patent: Oct. 21, 2025

(54) VEHICLE DRIVING ASSISTANCE APPARATUS

(71) Applicant: TOYOTA JIDOSHA KABUSHIKI KAISHA, Toyota (JP)

(72) Inventors: Kohei Tochigi, Shizuoka-ken (JP); Kota Endo, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 77 days.

(21) Appl. No.: 18/603,592

(22) Filed: Mar. 13, 2024

(65) Prior Publication Data
US 2024/0317224 A1 Sep. 26, 2024

(30) Foreign Application Priority Data

Mar. 24, 2023 (JP) .................................. 2023-048419

(51) Int. Cl.
*B60W 30/14* (2006.01)
*B60W 30/18* (2012.01)

(52) U.S. Cl.
CPC .... *B60W 30/143* (2013.01); *B60W 30/18145* (2013.01); *B60W 2552/30* (2020.02); *B60W 2720/10* (2013.01)

(58) Field of Classification Search
CPC ......... B60W 30/143; B60W 30/18145; B60W 2552/30; B60W 2720/10
See application file for complete search history.

(56) References Cited

U.S. PATENT DOCUMENTS

| | | |
|---|---|---|
| 8,355,851 B2 | 1/2013 | Inoue et al. |
| 8,370,040 B2 | 2/2013 | Inoue et al. |
| 8,417,430 B2 | 4/2013 | Saeki |
| 8,548,709 B2 | 10/2013 | Morita |
| 8,768,597 B2 | 7/2014 | Kagawa |
| 9,174,643 B2 | 11/2015 | Aso |
| 10,017,178 B2 | 7/2018 | Morimoto et al. |
| 10,118,617 B2 | 11/2018 | Urano et al. |

(Continued)

FOREIGN PATENT DOCUMENTS

| | | | | |
|---|---|---|---|---|
| CN | 107000746 A | * | 8/2017 | .......... B60W 40/114 |
| CN | 110871795 A | * | 3/2020 | ............ B60W 10/20 |

(Continued)

OTHER PUBLICATIONS

WO-2004045893-A1 translation (Year: 2004).*
CN-107000746-A translation (Year: 2017).*
CN-110871795-A translation (Year: 2020).*

*Primary Examiner* — Kyle T Johnson
(74) *Attorney, Agent, or Firm* — Sughrue Mion, PLLC

(57) ABSTRACT

A vehicle driving assistance apparatus executes a speed control of controlling a moving speed of an own vehicle to a target speed or less when the own vehicle moves on a curved road, and the moving speed of the own vehicle is greater than the target speed. While executing the speed control, the vehicle driving assistance apparatus controls a deceleration of the own vehicle by the speed control such that a deceleration of the own vehicle realized when an own vehicle moving course is within a drivable area of the curved road, is smaller than the deceleration of the own vehicle realized when a part of the own vehicle moving course is out of an outer boundary of the drivable area.

3 Claims, 4 Drawing Sheets

(56) References Cited

U.S. PATENT DOCUMENTS

| | | | |
|---|---|---|---|
| 10,486,698 B2 | 11/2019 | Masui et al. | |
| 2002/0052681 A1* | 5/2002 | Matsuno | B60T 8/1755 |
| | | | 701/80 |
| 2005/0216170 A1* | 9/2005 | Heinrichs-Bartscher | ............... |
| | | | B60W 30/16 |
| | | | 180/170 |
| 2008/0059037 A1* | 3/2008 | Isaji | B60W 10/20 |
| | | | 701/93 |
| 2013/0080019 A1* | 3/2013 | Isaji | B60W 30/16 |
| | | | 701/96 |
| 2013/0274996 A1* | 10/2013 | Sekine | G06F 17/00 |
| | | | 701/36 |
| 2015/0371542 A1* | 12/2015 | Fujishiro | B60W 30/12 |
| | | | 340/905 |
| 2016/0114794 A1* | 4/2016 | Sakaguchi | B60W 30/18145 |
| | | | 701/72 |
| 2018/0247537 A1* | 8/2018 | Oh | G01C 21/30 |
| 2019/0126933 A1* | 5/2019 | Jonasson | B60W 40/072 |
| 2019/0295419 A1 | 9/2019 | Tosa et al. | |
| 2019/0375405 A1 | 12/2019 | Mizoguchi | |
| 2020/0317192 A1* | 10/2020 | Awane | B62D 15/025 |
| 2021/0114620 A1* | 4/2021 | Yu | B60W 30/162 |
| 2021/0300364 A1* | 9/2021 | Sadamura | B60W 30/146 |
| 2023/0202464 A1* | 6/2023 | Oguro | B60W 40/06 |
| | | | 701/301 |
| 2024/0317224 A1* | 9/2024 | Tochigi | B60W 30/18145 |

FOREIGN PATENT DOCUMENTS

| | | | | |
|---|---|---|---|---|
| JP | 6755071 B2 | 9/2020 | | |
| WO | WO-2004045893 A1 * | 6/2004 | ......... | B60K 31/0066 |

* cited by examiner

VEHICLE DRIVING ASSISTANCE APPARATUS

CROSS-REFERENCE TO RELATED APPLICATIONS

This application claims priority to Japanese patent application No. JP 2023-048419 filed on Mar. 24, 2023, the content of which is hereby incorporated by reference in its entirety.

BACKGROUND

Field

The present invention relates to a vehicle driving assistance apparatus.

Description of the Related Art

There is known a vehicle driving assistance apparatus which is configured to (i) set a suitable vehicle moving speed or a suitable deceleration rate as a target speed or a target deceleration rate based on a curvature of a curved road such that a vehicle moves on the curved road at a suitable vehicle moving speed and (ii) control a vehicle moving speed to a speed equal to or smaller than the target speed or a deceleration rate to the target deceleration rate (refer to JP 6755071 B).

The known vehicle driving assistance apparatus described above sets the target speed or the target deceleration rate based on the curvature of the curved road. In this regard, a course of the vehicle to move varies depending on a steering angle of the vehicle, etc. even when the vehicle moves at the same vehicle moving speed. Thus, when the vehicle moving speed of the deceleration rate is controlled, using the target speed or the target deceleration rate set based on the curvature of the curved road, the deceleration of the vehicle may not be suitable for the vehicle to move on the curved road.

SUMMARY

An object of the present invention is to provide a vehicle driving assistance apparatus which can control a deceleration of the vehicle to a suitable deceleration when the vehicle moves on the curved road.

According to the present invention, a vehicle driving assistance apparatus comprises an own vehicle to a target speed or less when (i) the own vehicle moves on a curved road, and (ii) the moving speed of the own vehicle is greater than the target speed. While the electronic control unit is executing the speed control, the electronic control unit is configured to control a deceleration of the own vehicle by the speed control such that a deceleration of the own vehicle realized when an own vehicle moving course is within a drivable area of the curved road, is smaller than the deceleration of the own vehicle realized when a part of the own vehicle moving course is out of an outer boundary of the drivable area. The own vehicle moving course corresponds to a course of the own vehicle to move from a current position of the own vehicle to a predetermined distance ahead.

With the vehicle driving assistance apparatus according to the present invention, a degree of the deceleration of the own vehicle by the speed control is determined depending on the actual course of the own vehicle to move. Therefore, the deceleration of the own vehicle can be suitably controlled when the own vehicle moves on the curved road.

In the vehicle driving assistance apparatus according to an aspect of the present invention, the electronic control unit may be configured to set the predetermined distance such that the predetermined distance increases as a curvature of the curved road decreases.

With the vehicle driving assistance apparatus according to this aspect of the present invention, the degree of the deceleration of the own vehicle by the speed control can be determined depending on the curvature of the curved road.

In the vehicle driving assistance apparatus according to another aspect of the present invention, when a part of the own vehicle moving course is out of the outer boundary of the drivable area while the electronic control unit is executing the speed control, the electronic control unit may be configured to control the deceleration of the own vehicle by the speed control such that the deceleration of the own vehicle increases as a distance between the own vehicle and a point at which the own vehicle moving course exceeds the outer boundary of the drivable area, decreases.

With the vehicle driving assistance apparatus according to this aspect of the present invention, the degree of the deceleration of the own vehicle by the speed control can be determined depending on the distance between the own vehicle and the point at which the own vehicle moving course exceeds the outer boundary of the drivable area.

In the vehicle driving assistance apparatus according to further another aspect of the present invention, while the electronic control unit is executing the speed control, the electronic control unit may be configured to set the target speed, set (i) a target deceleration rate corresponding to a target value of a deceleration rate of the own vehicle, (ii) a target deceleration rate increasing rate corresponding to a target value of an increasing rate of the deceleration rate of the own vehicle, and (iii) a target deceleration assistance start point of time corresponding to a target value of a point of time of starting to decelerate the own vehicle such that the moving speed of the own vehicle is controlled to the target speed or less, and execute the speed control in accordance with the target speed, the target deceleration rate, the target deceleration rate increasing rate, and the target deceleration assistance start point of time. Further, when the own vehicle moving course is within the drivable area of the curved road while the electronic control unit is executing the speed control, the electronic control unit may be configured to control the deceleration of the own vehicle by the speed control such that the deceleration of the own vehicle is smaller than the deceleration of the own vehicle realized when a part of the own vehicle moving course is out of the outer boundary of the drivable area by executing at least one of a correction process of correcting the target speed so as to increase the target speed, a correction process of correcting the target deceleration rate so as to decrease the target deceleration rate, a correction process of correcting the target deceleration rate increasing rate so as to decrease the target deceleration rate increasing rate, and a correction process of correcting the target deceleration assistance start point of time so as to retard the target deceleration assistance start point of time.

With the vehicle driving assistance apparatus according to this aspect of the present invention, the deceleration of the own vehicle by the speed control can be decreased by correcting the target speed, the target deceleration rate, the target deceleration rate increasing rate, and the target deceleration assistance start point of time.

Elements of the invention are not limited to elements of embodiments and modified examples of the invention described with reference to the drawings. The other objects, features and accompanied advantages of the invention can be easily understood from the embodiments and the modified examples of the invention.

DESCRIPTION OF THE EMBODIMENTS

Figure 1:
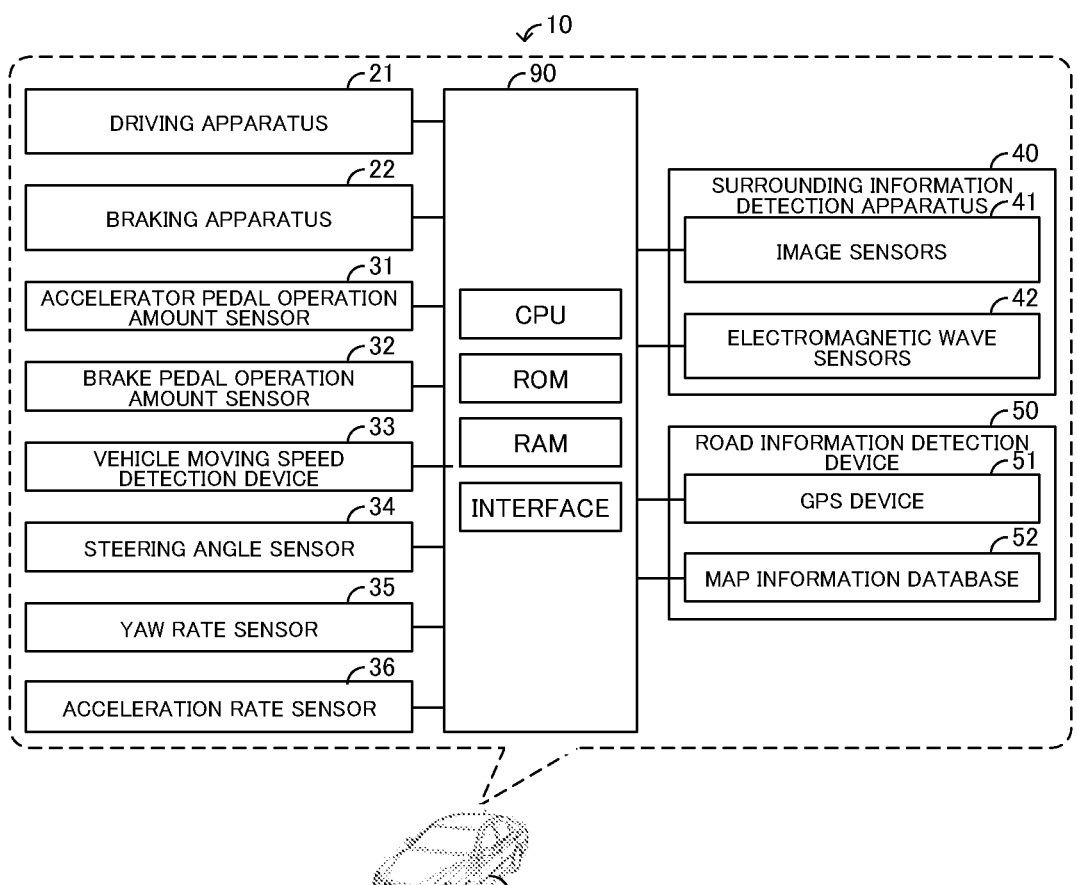
FIG. 1 is a view which shows a vehicle driving assistance apparatus according to an embodiment of the present invention.

Below, a vehicle driving assistance apparatus according to an embodiment of the present invention will be described with reference to the drawings. FIG. 1 shows the vehicle driving assistance apparatus 10 according to the embodiment of the present invention. The vehicle driving assistance apparatus 10 is mounted on an own vehicle 100. Hereinafter, the vehicle driving assistance apparatus 10 will be described by exemplifying a situation where an operator of the own vehicle 100 is a driver of the own vehicle 100, that is, a person who rides on the own vehicle 100 and directly drives the own vehicle 100.

In this regard, the operator of the own vehicle 100 may be a remote operator of the own vehicle 100, that is, an operator who is not in the own vehicle 100 but remotely drives the own vehicle 100. When the operator of the own vehicle 100 is the remote operator, the vehicle driving assistance apparatus 10 is mounted on the own vehicle 100 and a remote control facility installed outside the own vehicle 100 for remotely driving the own vehicle 100, and functions of the vehicle driving assistance apparatus 10 described below are shared by the vehicle driving assistance apparatus 10 mounted on the own vehicle 100 and the vehicle driving assistance apparatus 10 mounted on the remote control facility.

As shown in FIG. 1, the vehicle driving assistance apparatus 10 includes an ECU (electronic control device) 90 as a control device. The ECU 90 includes a microcomputer as a main component. The microcomputer includes a CPU, a storage medium such as a ROM, a RAM and a non-volatile memory, an interface, and the like. The CPU is configured or programmed to realize various functions by executing instructions, or programs, or routines stored in the storage medium. In particular, in the present embodiment, the vehicle driving assistance apparatus 10 stores programs of realizing various controls executed by the vehicle driving assistance apparatus 10 in the storage medium.

It should be noted that the vehicle driving assistance apparatus 10 may be configured to be able to update the programs stored in the storage medium by wireless communication (for example, internet communication) with external devices.

Further, the present invention is applicable to any of a vehicle that can be driven by manual driving operation and automatic driving control, a vehicle that is driven only by the manual driving operation, and a vehicle that is driven only by the automatic driving control. The manual driving operation is a driving operation performed by the operator to drive the vehicle. The automatic driving control is a control in which a control device such as an ECU automatically causes the vehicle to move without the operator performing a driving operation for causing the vehicle to move.

A driving apparatus 21 and a braking apparatus 22 are mounted on the own vehicle 100.

The driving apparatus 21 is an apparatus which generates a driving force applied to the own vehicle 100 for moving the own vehicle 100. The driving apparatus 21 includes, for example, an internal combustion engine and/or at least one electric motor. The driving apparatus 21 is electrically connected to the ECU 90. The vehicle driving assistance apparatus 10 controls the driving force applied to the own vehicle 100 by controlling an operation of the driving apparatus 21.

The braking apparatus 22 is an apparatus which generates a braking force applied to the own vehicle 100 for braking the own vehicle 100. The braking apparatus 22 includes, for example, a hydraulic braking apparatus. The braking apparatus 22 is electrically connected to the ECU 90. The vehicle driving assistance apparatus 10 controls the braking force applied to the own vehicle 100 by controlling an operation of the braking apparatus 22.

Further, the own vehicle 100 is equipped with an accelerator pedal operation amount sensor 31, a brake pedal operation amount sensor 32, a vehicle moving speed detection device 33, a steering angle sensor 34, a yaw rate sensor 35, and an acceleration rate sensor 36.

The accelerator pedal operation amount sensor 31 is a sensor which detects an operation amount of operating an accelerator pedal of the own vehicle 100 by the driver. The accelerator pedal operation amount sensor 31 is electrically connected to the ECU 90. The vehicle driving assistance apparatus 10 acquires the operation amount of operating the accelerator pedal as an accelerator pedal operation amount AP by the accelerator pedal operation amount sensor 31.

The brake pedal operation amount sensor 32 is a sensor which detects an operation depression amount of operating a brake pedal of the own vehicle 100 by the driver. The brake pedal operation amount sensor 32 is electrically connected to the ECU 90. The vehicle driving assistance apparatus 10 acquires the operation amount of operating the brake pedal as a brake pedal operation amount BP by the brake pedal operation amount sensor 32.

The vehicle moving speed detection device 33 is a device which detects a moving speed of the own vehicle 100. The vehicle moving speed detection device 33 includes, for example, vehicle wheel rotation speed sensors. The vehicle moving speed detection device 33 is electrically connected to the ECU 90. The vehicle driving assistance apparatus 10 acquires the moving speed of the own vehicle 100 as an own vehicle moving speed V by the vehicle moving speed detection device 33.

The steering angle sensor 34 is a sensor which detects a rotation angle of a steering wheel of the own vehicle 100 with respect to a neutral position. The steering angle sensor 34 is electrically connected to the ECU 90. The vehicle driving assistance apparatus 10 acquires the rotation angle of the steering wheel by the steering angle sensor 34, and acquires the steering angle of steered wheels of the own vehicle 100 as a steering angle $\theta$ based on the acquired rotation angle.

The yaw rate sensor 35 is a sensor which acquires a yaw rate of the own vehicle 100. The yaw rate sensor 35 is electrically connected to the ECU 90. The vehicle driving assistance apparatus 10 acquires the yaw rate of the own vehicle 100 as a yaw rate Y by the yaw rate sensor 35.

The acceleration rate sensor 36 is a sensor which detects a longitudinal acceleration rate of the own vehicle 100. The acceleration rate sensor 36 is electrically connected to the ECU 90. The vehicle driving assistance apparatus 10 acquires the acceleration rate of the own vehicle 100 as an acceleration rate G by the acceleration rate sensor 36.

Further, the own vehicle 100 is equipped with a surrounding information detection apparatus 40 and a road information detection device 50.

The surrounding information detection apparatus 40 is an apparatus which detects information on surroundings of the own vehicle 100. In the present embodiment, the surrounding information detection apparatus 40 includes image sensors 41 and electromagnetic wave sensors 42.

The image sensor 41 is a sensor which images and captures (or acquires) images of views around the own vehicle 100. The image sensor 41 is, for example, a camera. The image sensors 41 are electrically connected to the ECU 90. The vehicle driving assistance apparatus 10 acquires images (or surrounding images) of the views around the own vehicle 100 as surrounding detection information IFsur by the image sensors 41.

The electromagnetic wave sensor 42 is a sensor which detects objects existing around the own vehicle 100. The electromagnetic wave sensor 42 is, for example, a radio wave sensor such as a radar sensor such as a millimeter wave radar, a sound wave sensor such as an ultrasonic sensor such as a clearance sonar, or an optical sensor such as a laser radar such as a LIDAR. The electromagnetic wave sensors 42 are electrically connected to the ECU 90. The vehicle driving assistance apparatus 10 acquires, by the electromagnetic wave sensors 42, object information, i.e., information on the objects existing around the own vehicle 100 as the surrounding detection information IFsur.

The road information detection device 50 is a device which acquires information on an own vehicle moving road RD, i.e., a road on which the own vehicle 100 is moving. In the present embodiment, the road information detection device 50 includes a GPS device 51 and a map information database 52.

The GPS device 51 is a device which receives so-called GPS signals. The GPS device 51 is electrically connected to the ECU 90. The vehicle driving assistance apparatus 10 acquires the GPS signals via the GPS device 51, and acquires information indicating a current position of the own vehicle 100 as a current position information IFpos based on the acquired GPS signals.

The map information database 52 is a database in which map information including information on roads and the like is stored. The map information database 52 is electrically connected to the ECU 90. The vehicle driving assistance apparatus 10 acquires information on the own vehicle moving road RD from the map information database 52 as road information IFroad based on the current position information IFpos of the own vehicle 100.

<Operations of Vehicle Driving Assistance Apparatus>

Next, operations of the vehicle driving assistance apparatus 10 will be described. The vehicle driving assistance apparatus 10 is configured to execute a routine shown in FIG. 2 at a predetermined calculation cycle to execute a speed control of controlling the moving speed of the own vehicle 100 to a target speed or less when the moving speed of the own vehicle 100 is greater than the target speed while the own vehicle 100 is moving on a curved road CR (refer to FIG. 3).

Figure 2:
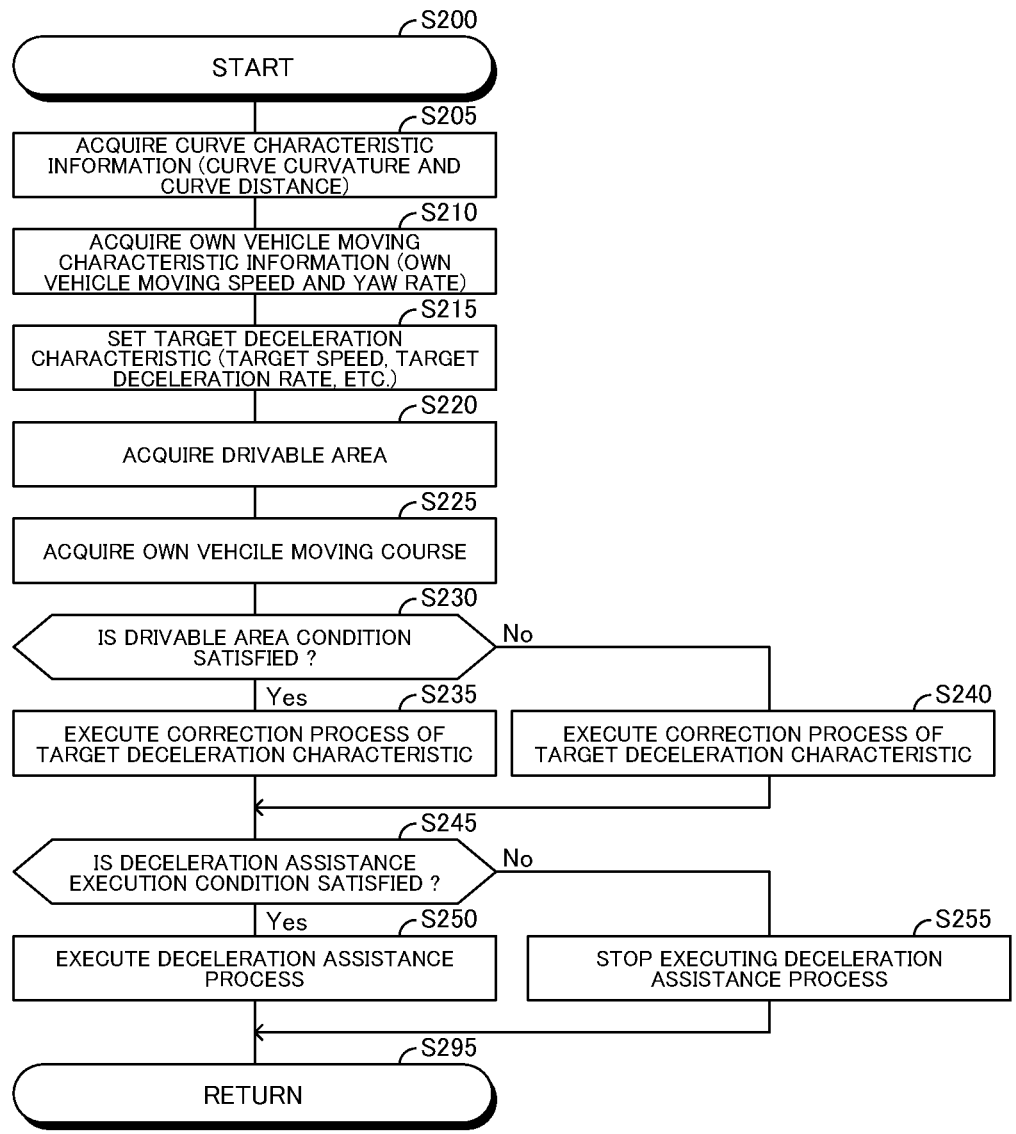
FIG. 2 is a view which shows a flowchart of a routine executed by the vehicle driving assistance apparatus according to the embodiment of the present invention.

At a predetermined point of time, the vehicle driving assistance apparatus 10 starts a process from a step S200 of the routine shown in FIG. 2, and proceeds with the process to a step S205 to acquire a curve characteristic information INcurve.

The curve characteristic information INcurve is information on the curved road CR on which the own vehicle 100 is moving. In the present embodiment, the curve characteristic information INcurve includes a curve curvature C and a curve distance Dcurve.

The curve curvature C is a curvature of the curved road CR on which the own vehicle 100 is moving. In the present embodiment, the curve curvature C is acquired based on the surrounding detection information IFsur and/or the road information IFroad.

Figure 3:
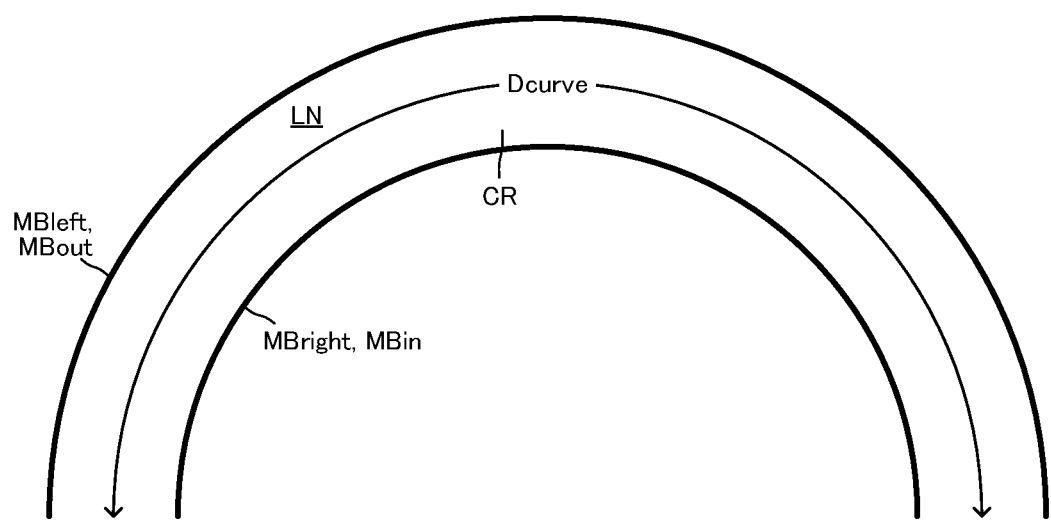
FIG. 3 is a view which shows a curve distance, etc.

The curve distance Dcurve is a distance of the curved road CR on which the own vehicle 100 is moving (refer to FIG. 3). In the present embodiment, the curve distance Dcurve is acquired based on the surrounding detection information IFsur and/or the road information IFroad.

Next, the vehicle driving assistance apparatus 10 proceeds with the process to a step S210 to acquire own vehicle moving characteristic information IFmove.

The own vehicle moving characteristic information IFmove is information on a moving condition of the own vehicle 100. In the present embodiment, the own vehicle moving characteristic information IFmove includes the own vehicle moving speed V and the yaw rate Y.

Next, the vehicle driving assistance apparatus 10 proceeds with the process to a step S215 to set a target deceleration characteristic.

The target deceleration characteristic is a characteristic which determines a strength or a magnitude of deceleration of the own vehicle 100. In the present embodiment, the target deceleration characteristic includes a target speed Vtgt, a target deceleration rate Gdec_tgt, a target jerk value dGdec_tgt, and a target deceleration assistance start point of time Tstart.

The target speed Vtgt is a target value of the moving speed of the own vehicle 100, i.e., the own vehicle moving speed V. In the present embodiment, the target speed Vtgt is set based on the curve curvature C. In particular, the target speed Vtgt is set to a value which becomes smaller as the curve curvature C increases.

The target deceleration rate Gdec_tgt is a target value of the deceleration rate of the own vehicle 100. In the present embodiment the target deceleration rate Gdec_tgt is set based on the target speed Vtgt, the own vehicle moving speed V, and the curve distance Dcurve. In particular, the target deceleration rate Gdec_tgt is set to a value which (i) becomes greater as a difference between the own vehicle moving speed V and the target speed Vtgt increases and (ii) becomes greater as the curve distance Dcurve decreases when the own vehicle moving speed V is greater than the target speed Vtgt.

The target jerk value dGdec_tgt is a target value of a deceleration rate increasing rate, i.e., an increase amount per unit time to increase the deceleration rate Gdec of the own vehicle 100 to the target deceleration rate Gdec_tgt. In the present embodiment, the target jerk value dGdec_tgt is set based on at least one of (i) the difference between the deceleration rate Gdec of the own vehicle 100 and the target deceleration rate Gdec_tgt, (ii) the own vehicle moving speed V, and (iii) the curve curvature C. In particular, the target jerk value dGdec_tgt is set to a value which (i) becomes greater as the difference between the deceleration rate Gdec of the own vehicle 100 and the target deceleration rate Gdec_tgt, increases, (ii) becomes smaller as the own vehicle moving speed V increases, and (iii) becomes smaller as the curve curvature C increases. In this regard, the target jerk value dGdec_tgt may be set to a constant value regardless of the difference between the deceleration rate Gdec of the own vehicle 100 and the target deceleration rate Gdec_tgt, the own vehicle moving speed V, and the curve curvature C.

The target deceleration assistance start point of time Tstart is a target value of a point of time of starting to decelerate the own vehicle 100, in particular, a target value of a point of time of starting to increase the deceleration rate Gdec of the own vehicle 100 toward the target deceleration rate Gdec_tgt. In the present embodiment, the target deceleration assistance start point of time Tstart is set based on the difference between the deceleration rate Gdec of the own vehicle 100 and the target deceleration rate Gdec_tgt, the own vehicle moving speed V, and the curve curvature C. In particular, the target deceleration assistance start point of time Tstart is set to a value which (i) becomes earlier as the difference between the deceleration rate Gdec of the own vehicle 100 and the target deceleration rate Gdec_tgt increases, (ii) becomes earlier as the own vehicle moving speed V increases, and (iii) becomes earlier as the curve curvature C increases. In this regard, the target deceleration assistance start point of time Tstart may be set to a constant value regardless of the difference between the deceleration rate Gdec of the own vehicle 100 and the target deceleration rate Gdec_tgt, the own vehicle moving speed V, and the curve curvature C.

Next, the vehicle driving assistance apparatus 10 proceeds with the process to a step S220 to acquire a drivable area RM.

The drivable area RM is a range of an area or a path in which the own vehicle 100 can move in the curved road CR. In an example shown in FIG. 3, the drivable area RM corresponds to a range of an own vehicle moving lane LN. The own vehicle moving lane LN is a lane defined by a left side boundary MBleft, i.e., a line marking such as a white line on the left side of the own vehicle 100 and a right side boundary MBright, i.e., a line marking such as a white line on the right side of the own vehicle 100. Further, in the present embodiment, the drivable area RM is acquired based on the surrounding detection information IFsur and/or the road information IFroad.

Next, the vehicle driving assistance apparatus 10 proceeds with the process to a step S225 to acquire an own vehicle moving course MC.

The own vehicle moving course MC is a course of the own vehicle 100 to move from the current position of the own vehicle 100 to a predetermined distance (or a predetermined moving distance Dmove_th) ahead. In other words, the own vehicle moving course MC is a course along which the own vehicle 100 is predicted to move until the own vehicle 100 moves the predetermined moving distance Dmove_th. In the present embodiment, the own vehicle moving course MC is acquired based on the own vehicle moving speed V, the yaw rate Y, and the steering angle θ. The predetermined moving distance Dmove_th may be a constant value, or may be set to a distance which becomes shorter as the curve curvature C increases.

Next, the vehicle driving assistance apparatus 10 proceeds with the process to a step S230 to determine whether a drivable area condition Cin is satisfied.

The drivable area condition Cin is a condition that the own vehicle moving course MC acquired at the step S225 is within the drivable area RM acquired at the step S220 or is out of an inner boundary MBin of the drivable area RM. The inner boundary MBin of the drivable area RM is a boundary which defines an inner side of the curved road CR. For example, in the curved road CR shown in FIG. 2, the inner boundary MBin of the drivable area RM is the right side boundary MBright. Further, in the following explanation, an outer boundary MBout of the drivable area RM is a boundary which defines an outer side of the curved road CR. For example, in the curved road CR shown in FIG. 2, the outer boundary MBout of the drivable area RM is the left side boundary MBleft.

Figure 4A:
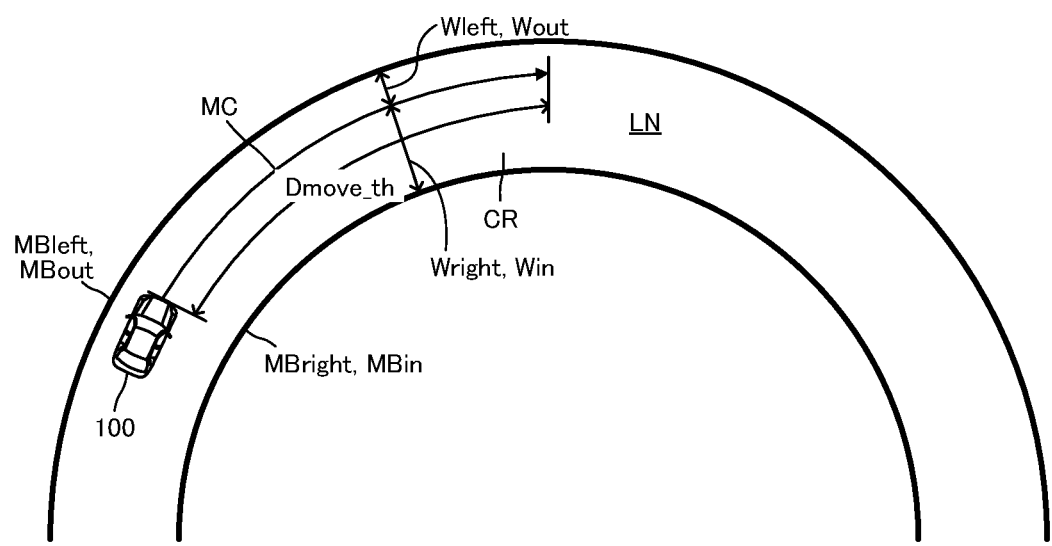
FIG. 4A is a view which shows a scene that an own vehicle moving course is within a drivable area.

For example, in the curved road CR shown in FIG. 4A, the own vehicle moving course MC is within the drivable area RM when the own vehicle moving course MC exceeds neither the left side boundary MBleft corresponding to the outer boundary MBout of the drivable area RM nor the right side boundary MBright corresponding to the inner boundary MBin of the drivable area RM. In this case, the vehicle driving assistance apparatus 10 determines that the drivable area condition Cin is satisfied.

In particular, in the present embodiment, when an outer lateral distance Wout and an inner lateral distance Win are equal to or greater than a predetermined lateral distance Wth at all points on the own vehicle moving course MC, the vehicle driving assistance apparatus 10 determines that the drivable area condition Cin is satisfied. In the curved road CR shown in FIG. 4A, when both of (i) a left lateral distance Wleft corresponding to the outer lateral distance Wout and (ii) a right lateral distance Wright corresponding to the inner lateral distance Win are equal to or greater than the predetermined lateral distance Wth at any point on the own vehicle moving course MC, the vehicle driving assistance apparatus 10 determines that the drivable area condition Cin is satisfied.

It should be noted that the outer lateral distance Wout is a distance between the own vehicle moving course MC and the outer boundary MBout in a width direction of the curved road CR, and the inner lateral distance Win is a distance between the own vehicle moving course MC and the inner boundary MBin in the width direction of the curved road CR. Therefore, the left lateral distance Wleft is a distance between the own vehicle moving course MC and the left side boundary MBleft in the width direction of the curved road CR, and the right lateral distance Wright is a distance between the own vehicle moving course MC and the right side boundary MBright in the width direction of the curved road CR. Further, the predetermined lateral distance Wth is set to be equal to or greater than zero.

Further, in the curved road CR shown in FIG. 4A, when the own vehicle moving course MC exceeds the right-side boundary MBright corresponding to the inner boundary MBin of the drivable area RM, a part of the own vehicle moving course MC is out of the inner boundary MBin of the drivable area RM. In this case, the vehicle driving assistance apparatus 10 determines that the drivable area condition Cin is satisfied. In particular, in the present embodiment, when the inner lateral distance Win is smaller than the predetermined lateral distance Wth at any point on the own vehicle moving course MC, the vehicle driving assistance apparatus 10 determines that the drivable area condition Cin is satisfied. In the curved road CR shown in FIG. 4A, when the right lateral distance Wright corresponding to the inner lateral distance Win, is smaller than the predetermined lateral distance Wth, the vehicle driving assistance apparatus 10 determines that the drivable area condition Cin is satisfied.

Figure 4B:
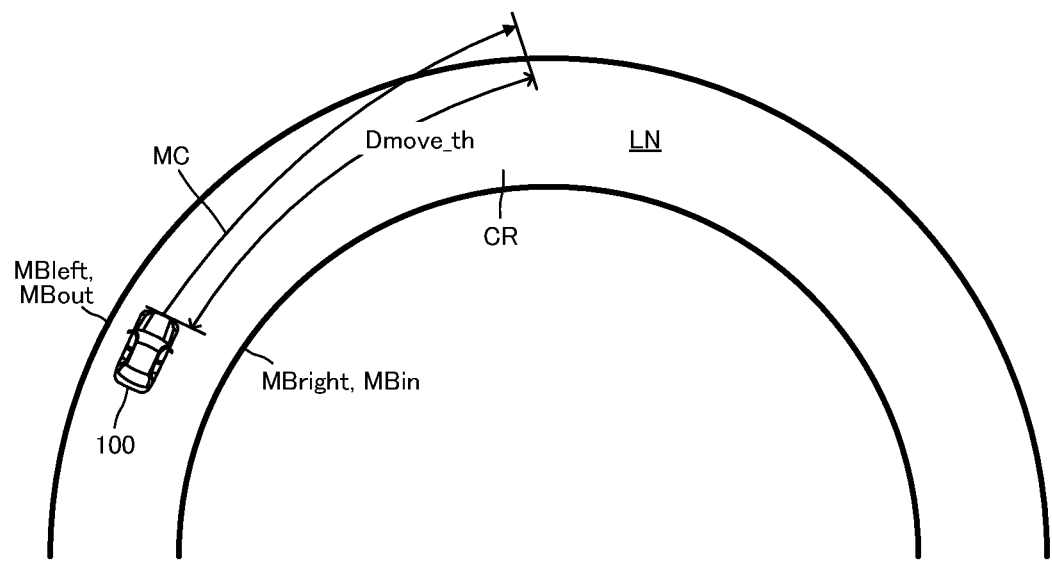
FIG. 4B is a view which shows a scene that a part of the own vehicle moving course is out of a left side boundary or an outer boundary of the drivable area.

On the other hand, as shown in FIG. 4B, when the own vehicle moving course MC exceeds the left side boundary MBleft corresponding to the outer boundary MBout of the drivable area RM, a part of the own vehicle moving course MC is out of the outer boundary MBout of the drivable area RM. In this case, the vehicle driving assistance apparatus 10 determines that the drivable area condition Cin is not satisfied. In particular, in the present embodiment, when the left lateral distance Wleft corresponding to the outer lateral distance Wout, is smaller than the predetermined lateral distance Wth at any point on the own vehicle moving course MC, the vehicle driving assistance apparatus 10 determines that the drivable area condition Cin is not satisfied.

When the vehicle driving assistance apparatus 10 determines "Yes" at the step S230, the vehicle driving assistance apparatus 10 proceeds with the process to a step S235 to execute a correction process of correcting the target deceleration characteristic set at the step S215.

The correction process executed at the step S235 is a process of correcting the target deceleration characteristic such that the deceleration of the own vehicle 100 by the speed control decreases or becomes weaker or smaller. In other words, the correction process execute at the step S235 is a process of correcting the target deceleration characteristic such that the deceleration of the own vehicle 100 by a deceleration assistance process described later decreases or becomes weaker or smaller. In particular, the correction process executed at the step S235 is at least one of (i) a process of increasing the target speed Vtgt, (ii) a process of decreasing the target deceleration rate Gdec_tgt, (iii) a process of decreasing the target jerk value dGdec_tgt, and (iv) a process of retarding the target deceleration assistance start point of time Tstart.

Next, the vehicle driving assistance apparatus 10 proceeds with the process to a step S245 to determines whether a deceleration assistance execution condition Cexe is satisfied.

In a situation where the target speed Vtgt is corrected at the step S235, the deceleration assistance execution condition Cexe is satisfied when the own vehicle moving speed V is greater than the corrected target speed Vtgt. In a situation where the target speed Vtgt is not corrected at the step S215, the deceleration assistance execution condition Cexe is satisfied when the own vehicle moving speed V is greater than the target speed Vtgt set at the step S215.

When the vehicle driving assistance apparatus 10 determines "Yes" at the step S245, the vehicle driving assistance apparatus 10 proceeds with the process to a step S250 to execute the deceleration assistance process.

The deceleration assistance process executed at the step S250 is a process of reducing the driving force applied to the own vehicle 100 in accordance with (i) the target speed Vtgt, (ii) the target deceleration rate Gdec_tgt, (iii) the target jerk value dGdec_tgt, and (iv) the target deceleration assistance start point of time Tstart, or a process of setting the driving force applied to the own vehicle 100 to zero and controlling the braking force applied to the own vehicle 100.

In this regard, in a situation where the target speed Vtgt is corrected at the step S235, the corrected target speed Vtgt is used in the deceleration assistance process. In a situation where the target deceleration rate Gdec_tgt is corrected at the step S235, the corrected target deceleration rate Gdec_tgt is used in the deceleration assistance process. In a situation where the target jerk value dGdec_tgt is corrected at the step S235, the corrected target jerk value dGdec_tgt is used in the deceleration assistance process. In a situation where the target deceleration assistance start point of time Tstart is corrected at the step S235, the corrected target deceleration assistance start point of time Tstart is used in the deceleration assistance process. On the other hand, in a situation where the corrected target speed Vtgt is not corrected at the step S235, the target speed Vtgt set at the step S215 is used in the deceleration assistance process. In a situation where the target deceleration rate Gdec_tgt is not corrected at the step S235, the target deceleration rate Gdec_tgt at the step S215 is used in the deceleration assistance process. In a situation where the target jerk value dGdec_tgt is not corrected at the step S235, the target jerk value dGdec_tgt set at the step S215 is used in the deceleration assistance process. In a situation where the target deceleration assistance start point of time Tstart is not corrected at the step S235, the target deceleration assistance start point of time Tstart set at the step S215 is used in the deceleration assistance process.

Then, the vehicle driving assistance apparatus 10 proceeds with the process to a step S295 to terminate executing this routine once.

On the other hand, when the vehicle driving assistance apparatus 10 determines "No" at the step S245, the vehicle driving assistance apparatus 10 proceeds with the process to a step S255 to stop executing the deceleration assistance process when the vehicle driving assistance apparatus 10 is executing the deceleration assistance process. Then, the vehicle driving assistance apparatus 10 proceeds with the process to the step S295 to terminate executing this routine once.

Further, when the vehicle driving assistance apparatus 10 determines "No" at the step S230, the vehicle driving assistance apparatus 10 proceeds with the process to a step S240 to execute a correcting process of correcting the target deceleration characteristic set at the step S215.

The correction process executed at the step S240 is a process of correcting the target deceleration characteristic such that the deceleration of the own vehicle 100 by the speed control increases or becomes stronger or greater. In other words, the correction process executed at the step S240 is a process of correcting the target deceleration characteristic such that the deceleration of the own vehicle 100 by the deceleration assistance process increases or becomes stronger or greater. In particular, the correction process executed at the step S240 is at least one of (i) a process of decreasing the target speed Vtgt, (ii) a process of increasing the target deceleration rate Gdec_tgt, (iii) a process of increasing the target jerk value dGdec_tgt, and (iv) a process of advancing the target deceleration assistance start point of time Tstart.

Next, the vehicle driving assistance apparatus 10 proceeds with the process to a step S245 to determine whether the deceleration assistance execution condition Cexe is satisfied.

In a situation where the target speed Vtgt is corrected at the step S240, the deceleration assistance execution condition Cexe determined at the step S245 is satisfied when the own vehicle moving speed V is greater than the corrected target speed Vtgt. On the other hand, in a situation where the target speed Vtgt is not corrected at the step S240, the deceleration assistance execution condition Cexe determined at the step S245 is satisfied when the own vehicle moving speed V is greater than the target speed Vtgt set at the step S215.

When the vehicle driving assistance apparatus 10 determines "Yes" at the step S245, the vehicle driving assistance apparatus 10 proceeds with the process to a step S250 to execute the deceleration assistance process.

In this regard, in a situation where the target speed Vtgt is corrected at the step S240, the corrected target speed Vtgt is used in the deceleration assistance process. In a situation where the target deceleration rate Gdec_tgt is corrected at the step S240, the corrected target deceleration rate Gdec_tgt is used in the deceleration assistance process. In a situation where the target jerk value dGdec_tgt is corrected at the step S240, the corrected target jerk value dGdec_tgt is used in the deceleration assistance process. In a situation where the target deceleration assistance start point of time Tstart is corrected at the step S240, the corrected target deceleration assistance start point of time Tstart is used in the deceleration assistance process. On the other hand, in a situation where the corrected target speed Vtgt is not corrected at the step S240, the target speed Vtgt set at the step S215 is used in the deceleration assistance process. In a situation where the target deceleration rate Gdec_tgt is not corrected at the step S240, the target deceleration rate Gdec_tgt at the step S215 is used in the deceleration assistance process. In a situation where the target jerk value dGdec_tgt is not corrected at the step S240, the target jerk value dGdec_tgt set at the step S215 is used in the deceleration assistance process. In a situation where the target deceleration assistance start point of time Tstart is not corrected at the step S240, the target deceleration assistance start point of time Tstart set at the step S215 is used in the deceleration assistance process.

Then, the vehicle driving assistance apparatus 10 proceeds with the process to the step S295 to terminate executing this routine once.

On the other hand, when the vehicle driving assistance apparatus 10 determines "No" at the step S245, the vehicle driving assistance apparatus 10 proceeds with the process to a step S255 to stop executing the deceleration assistance process when the vehicle driving assistance apparatus 10 is executing the deceleration assistance process. Then, the vehicle driving assistance apparatus 10 proceeds with the process to the step S295 to terminate executing this routine once.

The operations of the vehicle driving assistance apparatus 10 have been described.

As described above, while the speed control is executed, the vehicle driving assistance apparatus 10 decreases the deceleration of the own vehicle 100 by the speed control when the own vehicle moving course MC corresponding to a course of the own vehicle 100 to move from the own vehicle 100 to the predetermined distance or the predetermined moving distance Dmove_th ahead, is within the drivable area RM of the curved road CR, compared with when a part of the own vehicle moving course MC is out of the outer boundary MBout of the drivable area RM.

With the vehicle driving assistance apparatus 10, a degree of the deceleration of the own vehicle 100 by the speed control is determined in accordance with the course for the own vehicle 100 to actually move. Therefore, the deceleration of the own vehicle 100 can be controlled to an appropriate deceleration when the own vehicle 100 moves on the curved road CR.

It should be noted that the present invention is not limited to the above-described embodiments, and various modifications can be adopted within the scope of the present invention.

For example, in place of the processes of the step S235, the step S240, and the step S245 of the routine shown in FIG. 2, a following process of correcting at least one of (i) the target speed Vtgt, (ii) the target deceleration rate Gdec_tgt, (iii) the target jerk value dGdec_tgt, and (iv) the target deceleration assistance start point of time Tstart may be executed.

That is, after the process of the step S230, the vehicle driving assistance apparatus 10 may be configured to execute the correction process of increasing a degree of decreasing the target deceleration characteristic such that the deceleration of the own vehicle 100 by the speed control is further decreased as the drivable area distance Din (i.e., the distance that the own vehicle moving course MC is within the drivable area RM) increases when the drivable area distance Din is equal to or greater than a predetermined distance or a predetermined switching distance Dth. In this case, after the process of the step S230, the vehicle driving assistance apparatus 10 may be configured to execute the correction process of increasing the degree of increasing the target deceleration characteristic such that the deceleration of the own vehicle 100 by the speed control is further increased as the drivable area distance Din decreases when the drivable area distance Din is smaller than the predetermined switching distance Dth.

In particular, when the drivable area distance Din is equal to or greater than the predetermined switching distance Dth, the vehicle driving assistance apparatus 10 may be configured to execute at least one of (i) a process of increasing the target speed Vtgt by a greater amount as the drivable area distance Din increases, (ii) a process of decreasing the target deceleration rate Gdec_tgt by a greater amount as the drivable area distance Din increases, (iii) a process of decreasing the target jerk value dGdec_tgt by a greater amount as the drivable area distance Din increases, and (iv) a process of retarding the target deceleration assistance start point of time Tstart by a greater amount as the drivable area distance Din increases as the correction process.

On the other hand, when the drivable area distance Din is smaller than the predetermined switching distance Dth, the vehicle driving assistance apparatus 10 may be configured to execute at least one of (i) a process of decreasing the target speed Vtgt by a greater amount as the drivable area distance Din decreases, (ii) a process of increasing the target deceleration rate Gdec_tgt by a greater amount as the drivable area distance Din decreases, (iii) a process of increasing the target jerk value dGdec_tgt by a greater amount as the drivable area distance Din decreases, and (iv) a process of advancing the target deceleration assistance start point of time Tstart by a greater amount as the drivable area distance Din decreases as the correction process.

As described above, while the speed control is executed, the vehicle driving assistance apparatus 10 may be configured to increase the deceleration of the own vehicle 100 by the speed control as the drivable area distance Din (i.e., the distance between a point where the own vehicle moving course MC exceeds the outer boundary MBout of the drivable area RM and the own vehicle 100) decreases when a part of the own vehicle moving course MC is out of the outer boundary MBout of the drivable area RM.

Further, the vehicle driving assistance apparatus 10 may be configured to determine "Yes" at the step S230 and proceed with the process to the step S235 when a state of the own vehicle 100 is not an understeer state at a time of executing a process of the step S230. In this case, the vehicle driving assistance apparatus 10 may be configured to determine "No" at the step S230 and proceed with the process to the step S255 when the state of the own vehicle 100 is the understeer state at the time of executing the process of the step S230.

Further, the vehicle driving assistance apparatus 10 may be configured to determine whether the drivable area condition Cin at the step S230 is satisfied after the yaw rate Y or the steering angle θ starts decreasing from a maximal value. Alternatively, the vehicle driving assistance apparatus 10 may be configured to determine whether the drivable area condition Cin is satisfied at the step S230 after the steering wheel of the own vehicle 100 starts being turned back.

What is claimed is:

1. A vehicle driving assistance apparatus, comprising an electronic control unit configured to execute a speed control of controlling a moving speed of an own vehicle to a target speed or less when (i) the own vehicle moves on a curved road, and (ii) the moving speed of the own vehicle is greater than the target speed, wherein while the electronic control unit is executing the speed control, the electronic control unit is configured to control a deceleration of the own vehicle by the speed control such that a deceleration of the own vehicle realized when an own vehicle moving course is within a drivable area of the curved road, is smaller than the deceleration of the own vehicle realized when a part of the own vehicle moving course is out of an outer boundary of the drivable area, wherein the own vehicle moving course corresponds to a course of the own vehicle to move from a current position of the own vehicle to a predetermined distance ahead, and wherein while the electronic control unit is executing the speed control, the electronic control unit is configured to:

set the target speed;

set (i) a target deceleration rate corresponding to a target value of a deceleration rate of the own vehicle, (ii) a target deceleration rate increasing rate corresponding to a target value of an increasing rate of the deceleration rate of the own vehicle, and (iii) a target deceleration assistance start point of time corresponding to a target value of a point of time of starting to decelerate the own vehicle such that the moving speed of the own vehicle is controlled to the target speed or less; and execute the speed control in accordance with the target speed, the target deceleration rate, the target deceleration rate increasing rate, and the target deceleration assistance start point of time, and wherein when the own vehicle moving course is within the drivable area of the curved road while the electronic control unit is executing the speed control, the electronic control unit is configured to control the deceleration of the own vehicle by the speed control such that the deceleration of the own vehicle is smaller than the deceleration of the own vehicle realized when a part of the own vehicle moving course is out of the outer boundary of the drivable area by executing at least one of:

a correction process of correcting the target speed so as to increase the target speed;

a correction process of correcting the target deceleration rate so as to decrease the target deceleration rate;

a correction process of correcting the target deceleration rate increasing rate so as to decrease the target deceleration rate increasing rate; and a correction process of correcting the target deceleration assistance start point of time so as to retard the target deceleration assistance start point of time.

2. The vehicle driving assistance apparatus as claimed in claim 1, wherein the electronic control unit is configured to set the predetermined distance such that the predetermined distance increases as a curvature of the curved road decreases.

3. The vehicle driving assistance apparatus as claimed in claim 1, wherein when a part of the own vehicle moving course is out of the outer boundary of the drivable area while the electronic control unit is executing the speed control, the electronic control unit is configured to control the deceleration of the own vehicle by the speed control such that the deceleration of the own vehicle increases as a distance between the own vehicle and a point at which the own vehicle moving course exceeds the outer boundary of the drivable area, decreases.

* * * * *